March 16, 1965   K. G. WERNICKE ETAL   3,173,509
AIR CUSHION SUPPORTED VEHICLE
Filed March 21, 1960   6 Sheets-Sheet 1

INVENTORS:
KENNETH G. WERNICKE,
RODNEY K. WERNICKE
and WESLEY L. CRESAP
BY: Beau, Brooks, Buckley & Beau,
ATTORNEYS.

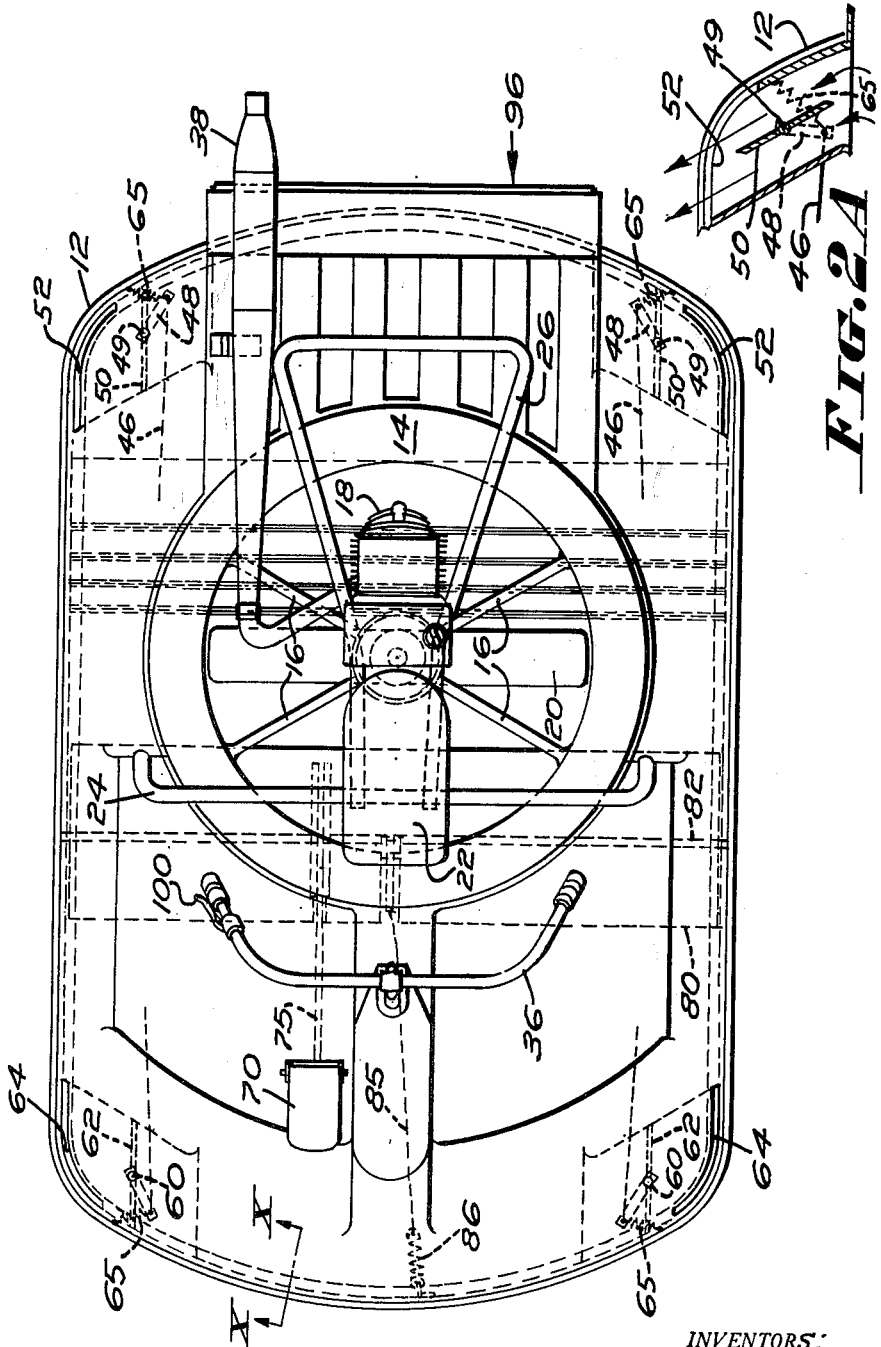

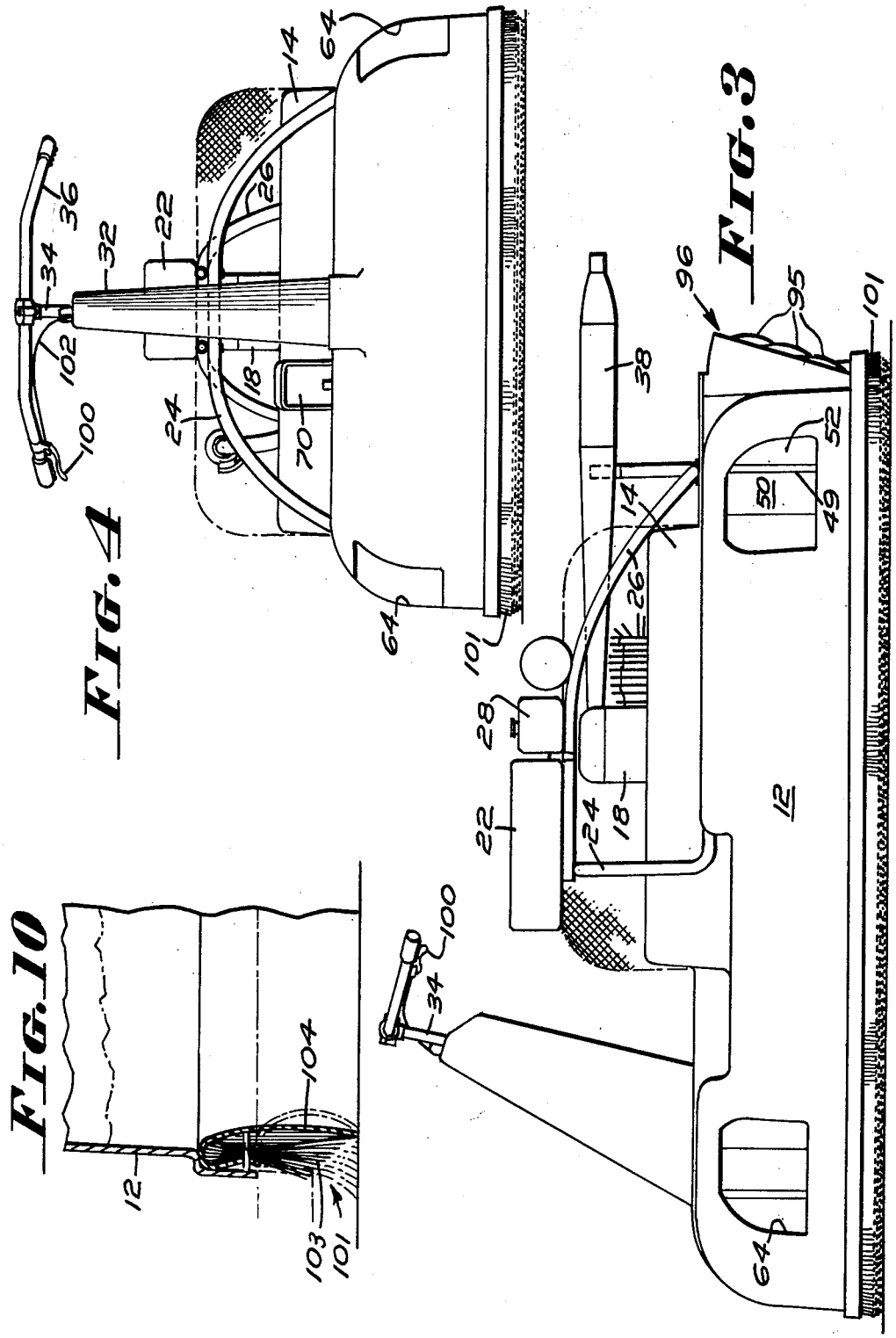

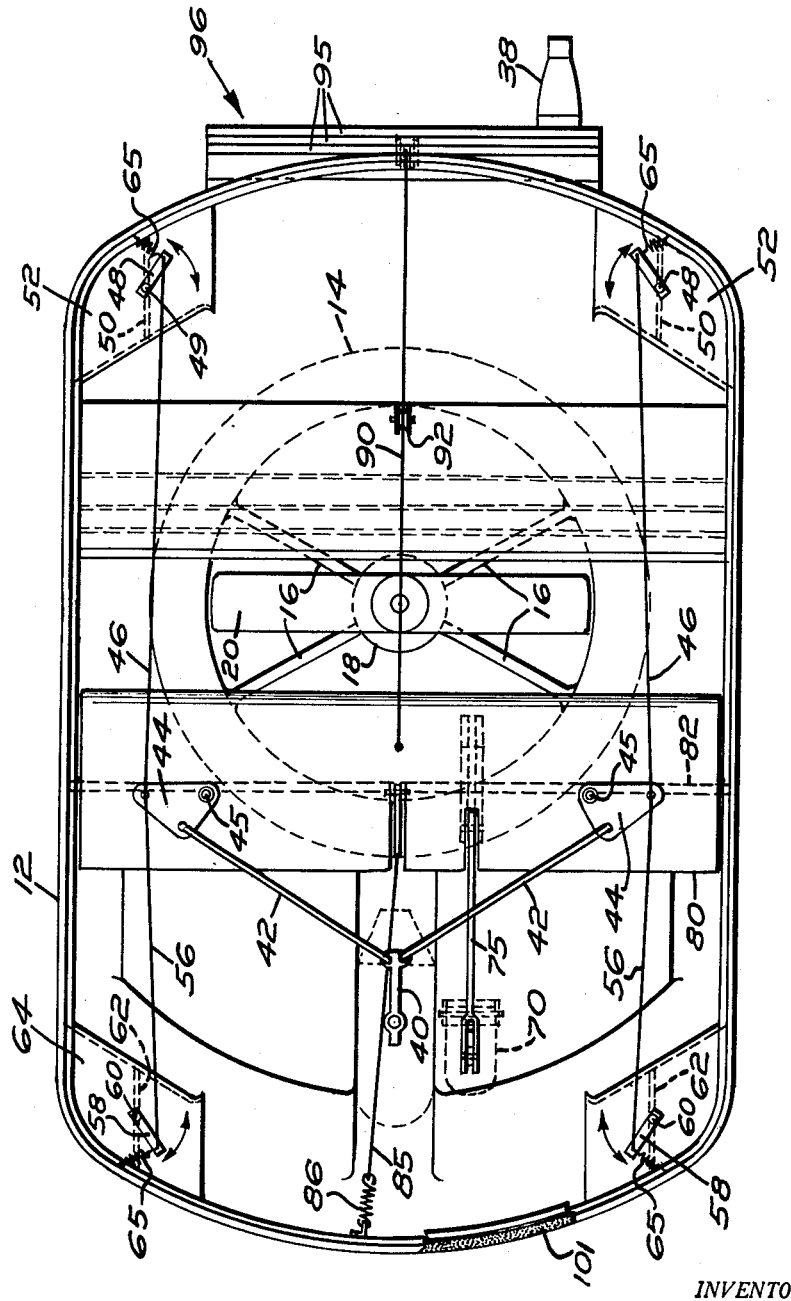

March 16, 1965 K. G. WERNICKE ETAL 3,173,509
AIR CUSHION SUPPORTED VEHICLE
Filed March 21, 1960 6 Sheets-Sheet 5
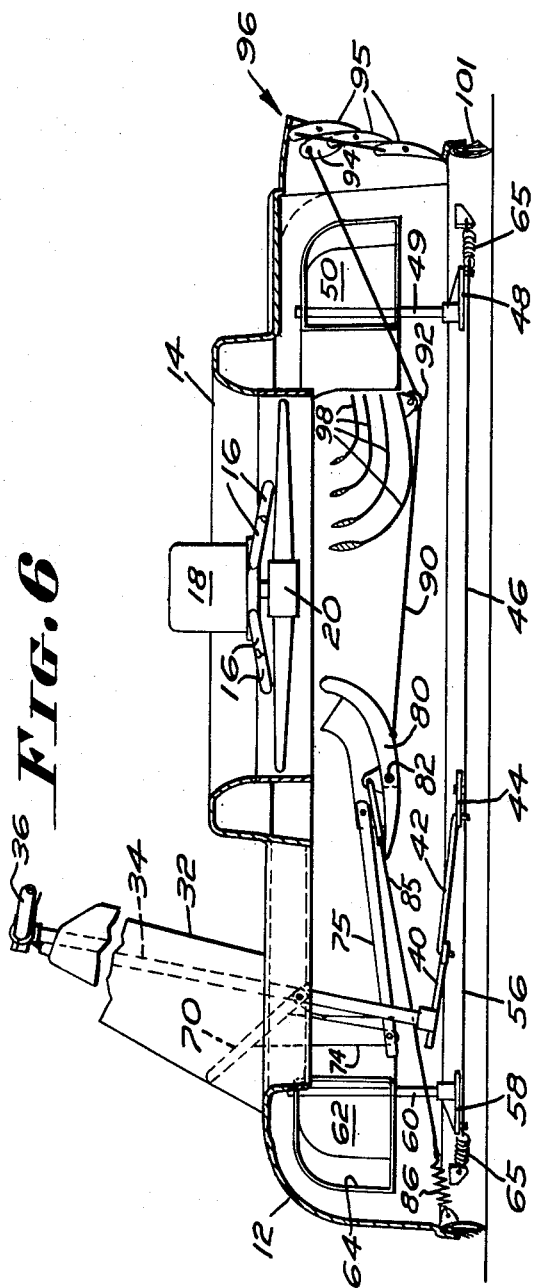
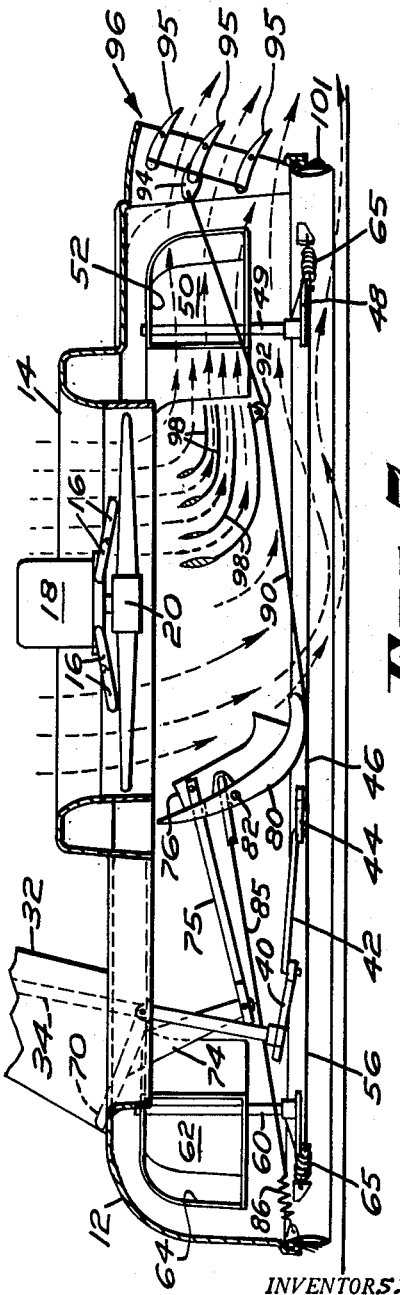
INVENTORS:
KENNETH G. WERNICKE,
RODNEY K. WERNICKE
and WESLEY L. CRESAP
BY: Beau, Brooks, Buckley & Beau,
ATTORNEYS.

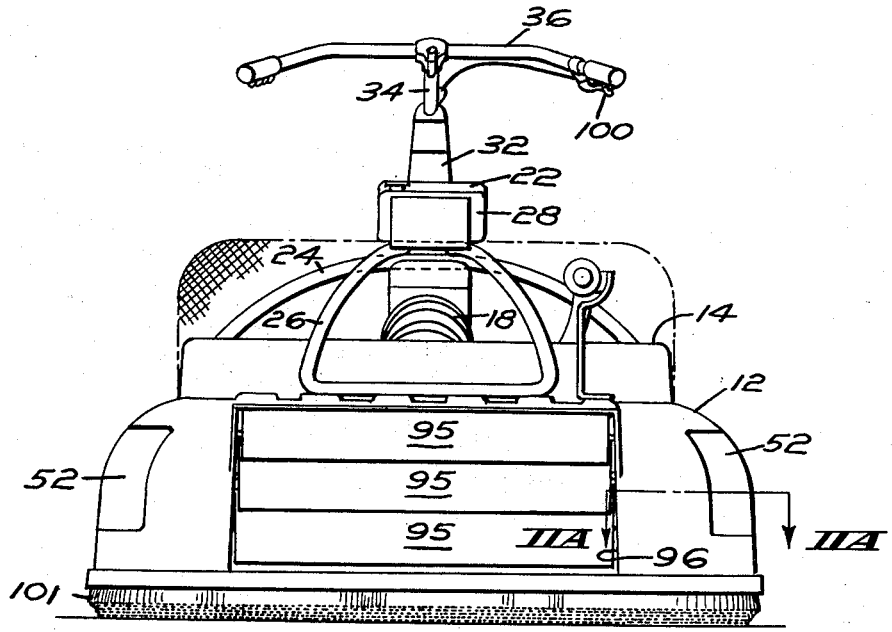
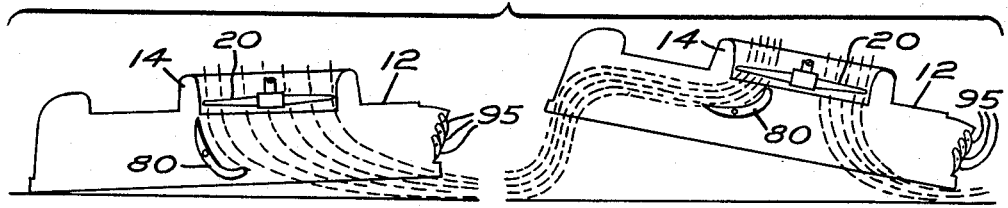
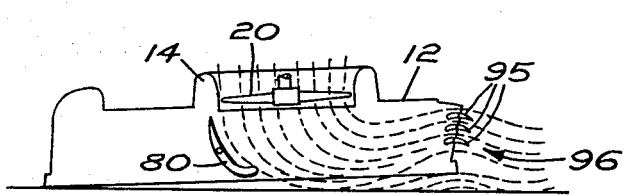

United States Patent Office 3,173,509
Patented Mar. 16, 1965

1

3,173,509
AIR CUSHION SUPPORTED VEHICLE
Kenneth G. Wernicke and Rodney K. Wernicke, Hurst, and Wesley L. Cresap, Fort Worth, Tex., assignors, by mesne assignments, to Bell Aerospace Corporation, Wheatfield, N.Y., a corporation of Delaware
Filed Mar. 21, 1960, Ser. No. 16,263
10 Claims. (Cl. 180—7)

This invention relates to vehicles of the type sometimes referred to as "air cushion" supported vehicles.

Previously devised methods for the control of propulsion and directional maneuverings of such vehicles contemplated angular adjustments of the air blast generating propeller and/or associated cowling devices, or shifting of the passenger weight to cause inclinations of the vehicle. However, such methods have been found to be lacking in certain essential respects; and a primary object of the present invention is to provide an improved and more efficient and practical means in such vehicles, for maneuvering control thereof. Other objects and advantages of the invention will appear from the following specification illustrating one example of how the invention may be embodied in a machine, including reference to the accompanying drawings wherein:

FIG. 2 is a top plan view thereof;

FIG. 2a is a fragmentary section taken on line 2a—2a of FIG. 8;

FIG. 3 is a side elevational view of the machine;

FIG. 4 is a front elevational view thereof;

FIG. 5 is a bottom plan view thereof;

FIG. 6 is a longitudinal vertical sectional view through the machine, showing the control system set in "hovering" control position;

Figure 1:
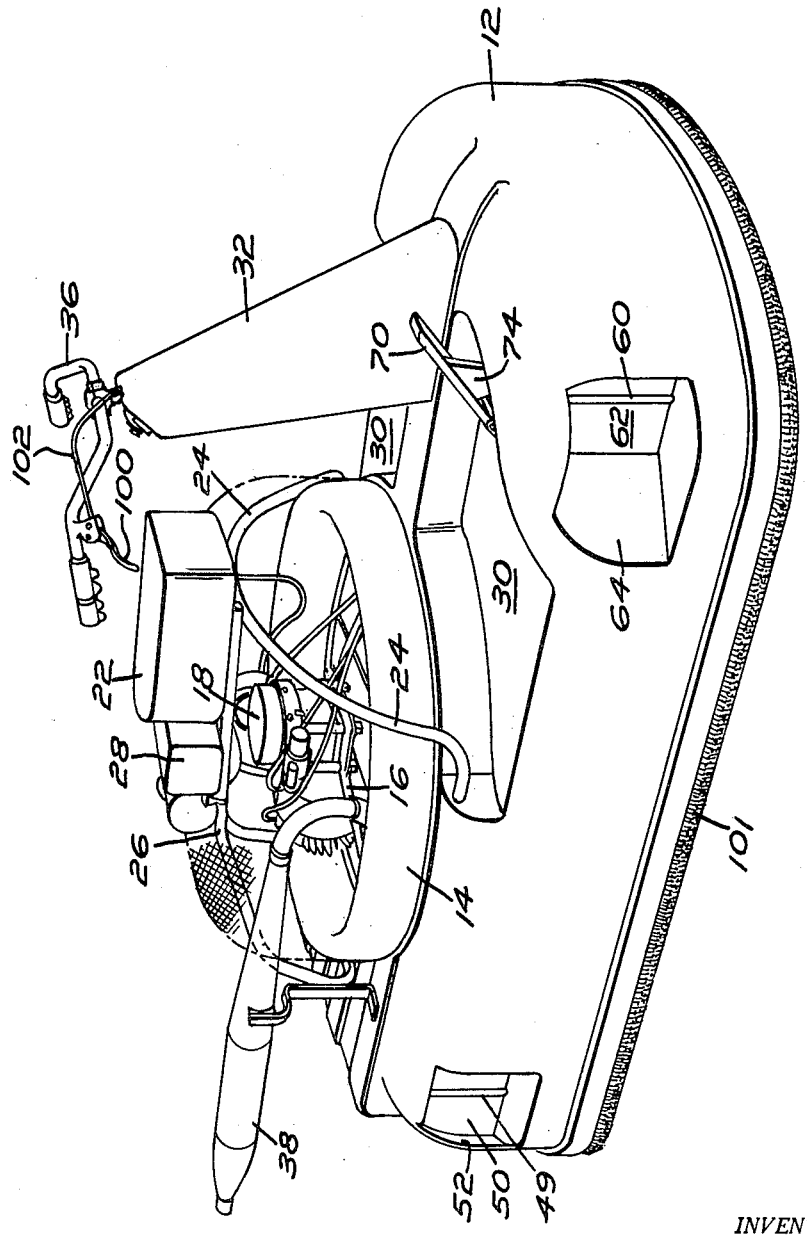
FIG. 1 is a perspective view of a vehicle embodying a maneuvering control arrangement of the invention.

FIG. 7 corresponds to FIG. 6 but shows the control system set in forward drive position;

FIG. 8 is a rear elevational view of the machine;

FIGS. 9a, 9b, 9c, are schematic illustrations showing operation of the propulsion control system of the invention; and FIG. 10 is a fragmentary sectional view, on enlarged scale, of a detail of a flexible skirt portion of the vehicle construction.

As shown in the drawing herewith, a machine embodying the features of the present invention may be constructed to include a body portion 12 which is generally tortoise-shaped and formed of sheet metal or any other suitable material. The body shell is of open bottom form and is otherwise generally closed but includes in its top deck portion a vertically directed cylindrical cowling formation 14 supporting therein by means of radial brackets 16, an engine 18 mounting a propeller 20 for rotation within the duct formed by cowling device 14. The propeller-engine unit is arranged so that when the propeller is driven to rotate it, it drives a blast of air in downward direction through the cowling 14 into the interior of the vehicle housing 12 and against the vehicle supporting surface therebelow. It is to be understood that the vehicle housing may be of any preferred form and may for example be of double wall form to include air cells thereby rendering the machine self-bouyant when resting on water.

A vehicle passenger seat as indicated at 22 is conveniently located above the engine 18 and approximately centrally of the cowling 14, by mounting it upon a frame work including tubular members 24—26; and engine accessories such as a fuel tank 28 may also be conveniently mounted on the frame work. As indicated at 30—30 (FIG. 1), the body portion 12 may be somewhat recessed in the upper deck portion thereof to provide suitable foot tread portions to accommodate the feet of the passengers when seated upon the seat cushion 22. For steering control purposes a housing as indicated at 32 may be provided to rotatably support a steering post 34 on the upper end of which is mounted a bicycle type handle bar arrangement 36. The engine exhaust conduit and muffler arrangement is indicated at 38.

The steering post 34 carries at its bottom end a crank arm 40 to which connect oppositely extending push-pull rods 42—42 which in turn pivotally connect to corresponding bell cranks 44—44 which are pivotally mounted upon suitable bracket portions of the machine frame as indicated at 45 (FIG. 5). The bell cranks connect to flexible cables 46—46 extending rearwardly therefrom to connection with crank devices 48—48 carried by vertical shafts 49 carrying air flow control vanes 50—50 which are thus pivotally mounted to control flow of air through air ducts 52—52. Similarly, cables 56—56 run from the bell cranks 44—44 forwardly towards corresponding corner portions of the vehicle housing and connect thereat with crank arms 58—58 carried by vertical shafts 60—60 which carry air flow control vanes 62—62 disposed to control the flow of air through duct devices 64—64, as will be explained more fully hereinafter. Tension springs, as indicated at 65 are arranged in connection with the crank devices 48, 58 so as to bias the air control vanes 50–62 towards duct closing positions.

The handle bar member 36 and the associated linkage and cable system is so arranged that when the handle bar is disposed in neutral or straight forward position, the air control vanes 50–62 are thereby disposed in their duct closing positions. Turning of the handle bar device towards the left, or in counterclockwise direction as viewed from above, will cause the air control vanes in the air ducts at the right hand forward and left hand rear corner portions of the machine to open, while the vanes controlling the left hand forward and the right hand rear ducts will remain closed by action of the springs 65. Thus, air flow downwardly into the interior of the body housing 12, as induced by operation of the fan 20, will then be permitted to flow through the right hand forward and left hand rearward ducts of the machine; thereby providing a turning movement tending to cause the machine to yaw in counterclockwise direction when viewed from above. It will of course be appreciated that opposite turning of the handle bar device will similarly procure an opposite turning movement of the machine; and that therefore in all cases the machine will tend to turn in the direction of control of the handle bar device.

Propulsion control of the vehicle is provided through use of a foot pedal device as illustrated at 70 which is pivotally mounted upon the vehicle frame and carries a control horn 74 (FIGS. 6, 7). The horn 74 pivotally connects through a push-pull member 75 to a flange portion 76 of an air flow control vane 80 which is pivotally mounted as indicated at 82 to be rotatable about a horizontal axis extending transversely of the machine frame, between the air flow control positions thereof as shown in FIGS. 6 and 7, as well as in FIGS. 9a, 9b. A cable 85 extends forwardly from a crank arm portion of the vane 80 into connection with a tension spring 86 based upon the vehicle frame, for biasing the vane 80 toward the position thereof shown in FIG. 6 of the drawing herewith.

Another cable 90 attached to the vane 80 extends rearwardly and around a guide pulley 92 and then into connection with a crank arm 94 which controls pivoting action of a plurality of louver vanes 95 which are mounted to pivot upon parallel axes in such manner as to alternatively close and open a rectangularly shaped and rearwardly directed air discharge duct 96 at the rear end of the vehicle. The control system is so arranged that when the control pedal 70 is released the control system is biased by the spring 86 to the position shown in FIG. 6 with the control louvers 95 in closed position.

When the pedal 70 is depressed however as to the position thereon shown in FIG. 7, the control vane 80 will be thereby rotated to the air blast deflecting position shown in FIG. 7 while the rear duct control louvers 95 will be rotated to their open position as shown in FIGS. 7 and 9c in the drawing herewith. Preferably, a series of generally parallel air blast turning vanes as indicated at 98 (FIGS. 6, 7) are rigidly attached to extend across the interior of the vehicle frame shell just rearwardly of the center of the duct 14 for guiding the rear portion of the down blast from the propeller to turn and move in rearward direction towards the discharge duct 96.

Any suitable control for the engine 18 is provided, such as by means of a speed control lever 100 mounted on the handle bar control 36 and connected with the engine throttle by means of a Bowden cable 102. Thus, by virtue of the control arrangement of the invention, when the engine 18 is started and then speeded up the propeller blast will be initially directed downwardly into the interior of the vehicle body and against the pavement or other support surface therebelow. The forward portion of the down blast will be deflected by the vane 80 (FIG. 6) into the forward end of the shell 12, while the rear portion of the down blast will be deflected rearwardly by the vanes 98 into the rear section of the vehicle shell. This results in a substantially even distribution of the uplift or air cushion developing force reacting upwardly against the vehicle body so as to cause it to lift in "hovering" position above the support surface.

To increase the obstacle clearance height of the vehicle it is preferred to employ some flexible skirt arrangement about the perimeter of the bottom edge of the body shell 12, such as indicated in the drawings at 101. As shown in more detail in FIG. 10, the skirt structure may conveniently comprise an arrangement of flexible bristles in brush-like form running vertically around the bottom edge of the shell as indicated at 103 and backed up by a plastic sheet type member 104. Thus, when the vehicle tilts so as to bring one edge thereof unduly close to the supporting surface, the plastic strip and the bristles bend as illustrated in broken lines in FIG. 10, while still maintaining the air-seal effect and without imposing substantial drag or scraping effects. Preferably, the bristle brush structure is beveled as shown in FIG. 10 to provide an improved structural stability for the skirt. Thus, when an edge of the vehicle dips so as to shorten the space between that edge portion of the vehicle and its supporting surface, the bristles will bend progressively according to their relative lengths, instead of simultaneously such as would result in an undesirable collapse of the skirt at that point.

To initiate forward movement of the vehicle, the control pedal 70 will be depressed as to the position shown in FIG. 7. This will cause the vane 80 to be turned to the rearwardly directing position thereof as shown in FIG. 7, and the rear duct control louvers 95 to be adjusted to open positions. Hence the majority of the air blast from the propeller will be now directed first downwardly against the vehicle support surface immediately below the propeller and then rearwardly through the rear discharge duct 96. The effective center of pressure acting upwardly against the vehicle body is thus displaced rearwardly, thereby producing a vehicle tail-lifting moment somewhat as shown in FIG. 9a and a forward thrust reaction force by means of the air blast discharge rearwardly through the duct 96 as shown in FIG. 9c. Independent operation of control vane 80 as shown in FIGS. 9b and 9a, produces tail-lifting moments accompanied by a forward thrust reaction force. Independent operation of the rear duct control louvers 95 will produce a forward thrust reaction force. Thus, it will be appreciated that the control system may be rigged in any preferred manner, in order to give any preferred ratio of tail-lifting moment to forward thrust; or that the two effects may be separately obtained by controlling the vane 80 and the rear duct control louvers 95 independently; or the two effects may be obtained sequentially, by displacement of the control pedal to different degrees. Incidental to all hovering and/or forward propulsion maneuvering, the directional control mechanism may also be passenger-operated to give the desired directional control of the craft.

We claim:

1. An air cushion supported type vehicle comprising in combination, an inverted shell-like body of generally rectangular plan form and having a vertically directed air duct extending through the top deck portion thereof, an air blast generating propeller means in association with said air duct for directing an air blast downwardly therethrough, a positionally adjustable air blast deflection vane disposed transversely of the interior of said body at a position under a portion of the air blast from said duct and adjustable to alternatively deflect said portion of the air blast forwardly or rearwardly within said body toward the front or rear ends thereof, a positionally fixed vane means disposed to intercept another portion of the down blast and to deflect it horizontally into the rear end of said body, a propulsion air-blast discharge opening at the rear end of said vehicle, louvre means adjustably mounted within said opening to alternatively open and close the latter, operator control means connected to said deflection vane and to said louvre means for simultaneously adjusting them to alternative air blast control positions, and vehicle directional steering means comprising laterally directed air blast discharge ports located substantially adjacent the plan-view corners of said vehicle body for air blast discharges alternatively in opposite directions laterally of the vehicle at positions fore and aft of the yaw axis thereof, air blast control valve means associated with each of said discharge ports, and manual steering control means operatively connected to said valve means for alternatively opening and closing said ports to obtain corresponding air blast generated turning moments about the vehicle yaw axis.

2. An air cushion supported type vehicle comprising in combination, an inverted shell-like body having a vertically directed air duct extending through the top deck portion thereof, an air blast generating means in association with said air duct for directing an air blast downwardly therethrough, a positionally adjustable air blast deflection vane disposed transversely of the interior of said body at a position under a portion of the air blast from said duct and adjustable to alternatively deflect said portion of the air blast forwardly or rearwardly within said body toward the front or rear ends thereof, positionally fixed vane means disposed to intercept another portion of the down blast and to deflect it horizontally into the rear end of said body, a propulsion air blast discharge opening at the rear end of said vehicle, louvre means adjustably mounted within said opening to alternatively open and close the latter, and operator control means connected to said deflection vane and to said louvre means for simultaneously adjusting them to alternative air blast control positions.

3. An air cushion supported type vehicle comprising in combinaion, an inverted shell-like body having a vertically directed cylindrical air duct extending through the top deck portion thereof, an air blast generating propeller means in association with said air duct for directing an air blast downwardly therethrough, a positionally adjustable air blast deflection vane disposed transversely of the interior of said body at a position under a portion of the air blast from said duct and pivotably adjustable to alternatively deflect said portion of the air blast horizontally forwardly or rearwardly within said body toward the front or rear ends thereof, positionally fixed vane means disposed to intercept another portion of the down blast and to deflect it horizontally into the rear end of said body, a propulsion air blast discharge opening directed rearwardly from the rear end of said vehicle, throttle means for controlling flow of air through said discharge opening, and operator control means connected to said deflection vane and to said throttle means for simultaneously adjusting them to alternative air blast control positions.

4. An air cushion supported type vehicle including an inverted shell-like body including a perimetral rim at its lower extremity and having means for generating a down blast of air to move through said body and against a vehicle supporting surface underlying said body and bounded by said rim and an air cushion seal device comprising a bristle brush arrangement fixed to said rim to extend therearound with the bristles thereof depending from said rim below the lowermost extremity of said body, and a plastic skirt extending downwardly from said rim interiorly of said bristle brush arrangement and backing up the latter when acting as an air seal between said vehicle body and its supporting surface.

5. An air cushion supported type vehicle including an inverted shell-like body having means for generating a down blast of air to move through said body and against the vehicle supporting surface, said body including a perimetral rim portion conforming generally to the vehicle supporting surface, an air cushion seal device comprising a bristle brush device fixed to said rim to extend therearound with the bristles thereof extending vertically therebelow, and a plastic skirt extending downwardly from said rim portion interiorly of said bristle brush device and backing up the latter when acting as an air seal between said vehicle body and its supporting surface, said bristle brush device being sectionally bevelled and the longest bristles thereof being adjacent said skirt and substantially coextensive therewith.

6. An air cushion supported vehicle comprising an inverted shell-like body having a substantially coplanar lower edge and an air duct, air blast generating means in association with said air duct for directing an air blast downwardly within the confines of said body to lift said lower edge thereof relative to a reaction surface, said body having a horizontally directed discharge opening in the rear thereof, louver means adjustably mounted within said opening to selectively open and close the same, deflector means adjustably mounted within said body for selectively establishing greater and lesser concentration of said air blast at the rear of said body, and control means for simultaneously actuating said louver means and said deflector means so as to cause a greater concentration of the air blast at the rear of said body when said louver means is open.

7. An air cushion vehicle comprising an inverted shell-like body having a substantially coplanar lower edge and an air duct, air blast generating means associated with said air duct for directing an air blast downwardly within the confines of said body, fixed vane means mounted in said body for deflecting a portion of said air blast into the rearward region of said body, movable vane means mounted within said body for normally deflecting another portion of said air blast into the forward region of said body, and control means for moving said movable vane from its stated normal position to a position in which substantially all of said air blast is directed into the rearward portion of said body.

8. The vehicle according to claim 7 wherein said body is provided with a horizontally directed opening in its rearward portion, louver means adjustably mounted in said opening to selectively open and close the same, said control means also being connected to said louver means to uncover said opening when said movable vane is moved toward the last stated position thereof.

9. A plenum chamber type ground effect machine comprising, in combination,
an inverted shell-like body having a substantially coplanar lower edge defining an open bottom plenum chamber communicating throughout the area defined by said lower edge with an underlying reaction surface, said body also having an air inlet,
air blast generating means disposed in association with said air inlet for directing an air blast downwardly within said body and through the open bottom thereof into impingement against the underlying reaction surface bounded by the lower edge of said body for filling the plenum chamber with superatmospheric air,
deflecting means movably mounted within said body below said air blast generating means for shifting the direction of said air blast within and throughout the confines of said lower edge of the body,
and control means for moving said deflecting means,
said deflecting means being in the form of an arcuate vane extending transversely of the body and movable about a transverse horizontal axis for selectively elevating fore and aft regions of said body.

10. The vehicle as defined in claim 9 wherein said body is provided with a horizontally directed discharge opening in the aft region thereof, louver means adjustably mounted within said opening to selectively open and close the latter.

References Cited by the Examiner

UNITED STATES PATENTS

| 242,668 | 6/81 | Male | 104—134 |
|---|---|---|---|
| 1,123,589 | 1/15 | Porter. | |
| 2,387,627 | 10/45 | Warner. | |
| 2,834,560 | 5/58 | Werner et al. | |
| 2,838,257 | 6/58 | Wibault. | |
| 2,969,937 | 1/61 | Trojahn. | |
| 3,050,146 | 8/62 | Crim | 180—7 |
| 3,055,446 | 9/62 | Vaughen | 180—7 |
| 3,066,753 | 12/62 | Hurley et al. | 180—7 |
| 3,090,455 | 5/63 | Crowley | 180—7 |
| 3,106,260 | 10/63 | Bollum | 180—7 |

OTHER REFERENCES

Aviation Week, July 6, 1959, pages 115 and 116.

A. HARRY LEVY, *Primary Examiner.*

WILLIAM KANOF, *Examiner.*